United States Patent
Dottel

(10) Patent No.: US 6,250,460 B1
(45) Date of Patent: Jun. 26, 2001

(54) DEVICE FOR PROTECTING INFORMATION AND/OR DATA STORAGE MEDIA

(75) Inventor: Jean-Marc Dottel, Valenciennes (FR)

(73) Assignee: Achat et Distribution d'Articles de Classement, Valenciennes (FR)

( * ) Notice: Subject to any disclaimer, the term of this patent is extended or adjusted under 35 U.S.C. 154(b) by 0 days.

(21) Appl. No.: 09/506,842

(22) Filed: Feb. 18, 2000

(30) Foreign Application Priority Data

Feb. 19, 1999 (FR) .................................................. 99 02254

(51) Int. Cl.[7] .................................................. B65D 85/57

(52) U.S. Cl. ........................ 206/308.1; 206/311; 206/312

(58) Field of Search .............................. 206/307, 307.1, 206/308, 308.1, 308.3, 309–313, 425; 281/38, 40, 41; 402/70, 73, 79

(56) References Cited

U.S. PATENT DOCUMENTS

| 5,407,067 | * | 4/1995 | Cotter et al. ........................ 206/312 |
| 5,588,528 | * | 12/1996 | Ozeki .................................. 206/312 |
| 5,595,797 | * | 1/1997 | Miller .................................. 206/312 |
| 5,620,271 | * | 4/1997 | Bergh et al. ........................ 206/307 |
| 5,632,374 | * | 5/1997 | Fitzsimmons et al. ........... 206/308.1 |

* cited by examiner

*Primary Examiner*—Luan K. Bui
(74) *Attorney, Agent, or Firm*—Harrison & Egbert

(57) ABSTRACT

A device for protecting information and/or data storage media, consisting of a flexible pocket (1) having at least two opposite faces (2, 3), locally rendered integral with one another, and designed to be able to receive disk-shaped objects (4), in particular Compact Disc Read-Only Memories or other digital data storage media, having a diameter D, the pocket (1) being designed to be substantially rectangular, with a length of less than 3D, or a multiple of 3D, and a width of less than 2D, or a multiple of 2D, the device including dividers for of dividing the pocket (1) into three separate compartments (6a, 6b, 6c), or a multiple of three separate compartments, to receive the objects (4) in staggered locations.

7 Claims, 1 Drawing Sheet

DEVICE FOR PROTECTING INFORMATION AND/OR DATA STORAGE MEDIA

TECHNICAL FIELD

The invention relates to a device for protecting information and/or data storage media to receive disk-shaped objects, in particular Compact Disc Read-Only Memories, or CD-ROM's, or other digital data storage media.

However, although more specifically designed for such applications, it can be used, more generally, with all types of disk.

BACKGROUND ART

There are known, at the present time, devices for protecting information and/or data storage media consisting of flexible pockets subdivided into six compartments of the same size and distributed in two columns of three compartments each, provided symmetrically on either side of the longitudinal axis of said pocket, to receive computer diskettes of the so-called 3½ inch format.

Although satisfactory for such applications, these pockets are not suitable for storing CD-ROM's, since these are too large for the compartments in question.

If one wishes to store disk-shaped objects of CD-ROM format, that is to say disks having a diameter of approximately 11.9 cm (4.69 inches), in a flexible pocket of A4 format, that is to say 21×29.7 cm (8.27×11.69 inches), one realizes, that the respective dimensions of the pocket and of the disks do not facilitate their placing in separate compartments.

SUMMARY OF THE INVENTION

The object of the present invention is to provide a device for protecting information and/or data storage media that overcomes the aforementioned drawbacks and makes it possible to store a maximum number of disk-shaped objects, in particular CD-ROM's or other digital data storage media, in separate locations in a flexible pocket.

Another object of the present invention is to provide a device for protecting information and/or data storage media that makes it possible to ensure that the disk-shaped objects stored, in particular CD-ROM's or other digital data recording media, are held in place.

A further object of the present invention is to provide a device for protecting information and/or data storage media that facilitates the introduction/extraction of the disk-shaped objects, in particular CD-ROM's or other digital data storage media, that are stored.

Another object of the present invention is to provide a device for protecting information and/or data storage media that makes it easier to take hold of the disk-shaped objects, in particular CD-ROM's or other digital data storage media, when stored in the device.

Another object of the present invention is to provide a device for protecting information and/or data storage media that is simpler to manufacture and the strength of which is preserved.

Further objects and advantages of the invention will emerge in the course of the following description, which is given only by way of illustration and is not intended to limit same.

The invention relates to a device for protecting information and/or data storage media, consisting of a flexible pocket having at least two opposite faces, locally rendered integral with one another, and designed to be able to receive disk-shaped objects, in particular CD ROM's or other digital data storage media, having a diameter D. The pocket is being designed to be substantially rectangular, with a length of less than 3D, or a multiple of 3D, and a width of less than 2D, or a multiple of 2D. The device includes means of dividing the pocket into three separate compartments, or a multiple of three separate compartments, to receive the objects in staggered locations.

The invention also relates to a device as described above, receiving, In at least one of its the compartments, a disk-shaped object.

BRIEF DESCRIPTION OF THE DRAWINGS

The invention will be more readily understood from a study of the following description, accompanied by the annexed drawing, which forms an integral part thereof.

DETAILED DESCRIPTION OF THE INVENTION

Figure 1:
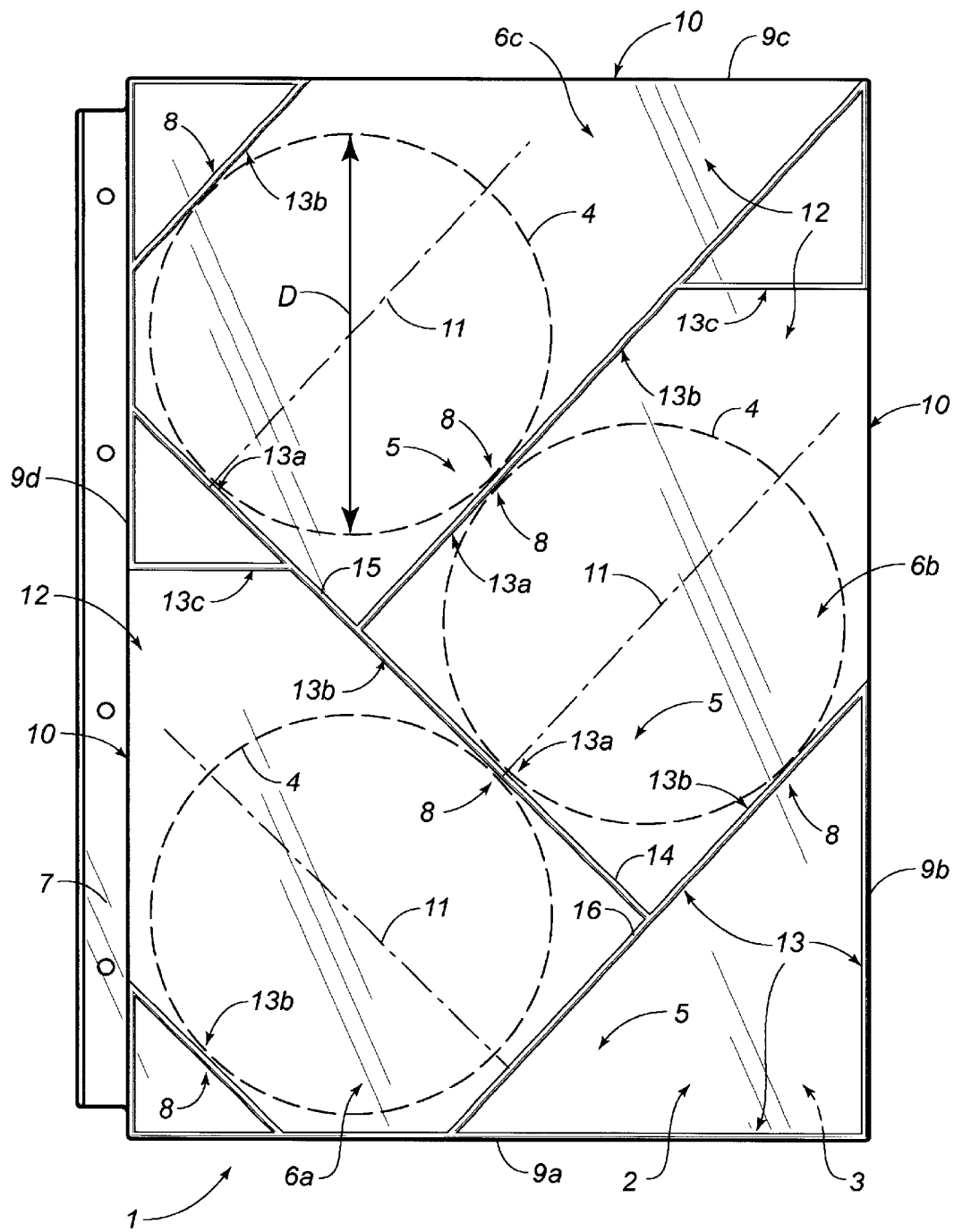
FIG. 1 is a plan view of an exemplary form of an embodiment of the device for protecting Information and/or data storage media according to the invention.

The invention relates to a device for protecting information and/or data storage media designed to receive disk-shaped objects, in particular CD ROM's or other digital data storage media.

However, although more specifically designed for such applications, it can be used, in general, with all types of disk.

As illustrated in FIG. 1, the invention relates to a device for protecting information and/or data storage media, consisting of a flexible pocket, 1, having at least two opposite faces, 2, 3, locally rendered integral with one another. The pocket 1 is of a substantially rectangular shape.

While the pocket has a length of less than 3D, or a multiple of 3D, and a width of less than 2D, or a multiple of 2D, it is wished to be able to receive, in the device for protecting information and/or data storage media, disk-shaped objects, 4, having a diameter D. The device is a flexible pocket of A4 format (21×29.7 cm) (8.27×11.69 inches)) inside of which it is wished to store CD-ROM's having a diameter of approximately 11.9 cm (4.69 inches).

For this purpose, the device includes means, 5, for dividing the pocket 1 into three compartments, 6a, 6b, 6c, or a multiple of three separate compartments, to receive the objects 4 in staggered locations. It is thus possible to optimize the storage of the objects 4.

The pocket 1 is formed, in particular, of a plastic or similar material, possibly having a certain elasticity. One and/or the other of its faces, 2, 3, is/are designed to be transparent.

In order to enable it to be filed, pocket 1 can be extended laterally in the area of one of its longitudinal edges, by a binding strip, 7, perforated if necessary.

This being the case, the dividing means 5 are designed to be capable of holding the objects 4 in place at two opposite points, 8, on their circumference and/or of guiding the objects 4 in their compartments 6a, 6b, 6c.

While keeping the composition and manufacture of a pocket 1 relatively simple, it is thus possible to facilitate the immobilization of the stored objects, as well as their extraction from/insertion into their compartments.

All of the compartments 6a, 6b, 6c have an opening, 10, formed by all or a part of one of the edges, 9a, 9b, 9c, 9d, of the pocket 1, whereof the two faces, 2, 3, in the area of the openings 10, are designed not to be integral.

This facilitates the manufacture of the pocket 1, because it is not necessary to carry out further work to provide cut out portions to form the openings of the compartments.

Except in the area of the openings 10, the two faces 2, 3 can be designed to be integral over the entire contour of the pocket 1. The pockets thus offer better rigidity and their edges are less fragile.

In the case of a pocket 1 having three compartments, 6a, 6b, 6c, the openings 10 of each of the compartments are provided, in particular, in the area of three different edges of pocket 1.

The compartments 6a, 6b, 6c have, between their respective bottoms and openings, a longitudinal axis, 11 inclined in relation to edges 9a, 9b, 9c, 9d of pocket 1.

All of the compartments 6a, 6b, 6c are then possibly orientated in the same direction so that each can enable the objects 4 to be directed towards the bottom or towards the opening of their respective compartments, under their own weight, when pocket 1 is held vertically.

It is thus made easier to hold objects 4 in place in their compartments and there is no risk of their dropping out of them, when pocket 1 is simply displaced, for example when a file in which it is stored is handled.

Another advantage of the inclined orientation of compartments 6a, 6b, 6c can also be perceived in the fact that it makes it possible to provide, at least in the vicinity of openings 10, an area, 12, where the user can easily insert his or her thumb and forefinger to take hold of stored objects 4.

The angle of inclination of the longitudinal axis or axes 11 varies between 35° and 55° in relation to the edges of pocket 1. It is more precisely, approximately 45°.

The dividing means 5 are formed of areas of connection between the faces 2, 3 of pocket 1 provided in the form of lines, 13, or so-called connecting lines.

The connecting lines 13 are produced by the welding localized on the two faces 2, 3.

All or part of the compartments 6a, 6b, 6c are separated, at least locally, by a connecting line, which is possibly common, 13a.

All or part of the compartments have, in particular, at least two lines 13b for connecting the faces, substantially parallel to one another and substantially spaced apart by a distance D so as to immobilize the objects in their compartments.

The connecting lines 13b used to immobilize the objects are, possibly, of a short length. It suffices, in fact, for them to permit localized contact tangentially with object 4 stored in the corresponding compartment.

According to another embodiment, the two connecting lines 13b enabling the objects to be immobilized are provided so as to be extended in the direction of the openings 10 of the compartments so as to enable the objects to be guided.

By providing a spacing having a dimension D between the connecting lines 13b used to immobilize the objects, one can thus make use of the flexibility of the pocket, possibly its elasticity, to hold objects 4 in place as a function of their thickness through co-operation with connecting lines 13.

One part, at least, of the connecting lines 13b permitting immobilization of objects 4 can possibly also define one part, at least, of a the connecting line 13a to ensure common separation of one compartment from another of the compartments, with this applying to all or part of the compartments.

The latter can further have one or more lines 13c connecting the faces 2, 3 to complete the guiding of the objects, these lines being provided substantially perpendicularly to one of the edges of the pocket 1, in the area of one of the ends of the corresponding opening 10.

According to the form of embodiment illustrated, the device comprises three compartments.

A first compartment, 6a, is designed to enable one object 4 to be placed at the bottom of the compartment, tangentially to one of the transverse edges, 9a, referred to as the first edge, of the pocket 1, opening 10 of the first compartment 6a being provided on one of the edges, 9d, referred to as the second edge, orthogonal to the first edge 9a.

A second compartment, 6b, has a longitudinal axis of which is orthogonal to that of the first compartment 6a, and the opening 10 of which is provided in the area of edge 9b, referred to as the third edge, parallel to the second edge 9d.

A third compartment, 6c, has a longitudinal axis of which is parallel to that of the second compartment 6b and the opening 10 of which is provided in the area of the fourth edge, 9c, of pocket 1.

The compartments 6a, 6b, 6c, 6d are, according to this example, orientated at approximately 45° in relation to the edge of pocket 1 in the area of which they emerge.

Furthermore, the first, second and third compartments have two connecting lines 13 b permitting immobilization of the object, extending to their openings, one immobilization permitting connecting line of said the compartment 6a defining at, least partially, the bottom 14, 15 of the second and third compartments 6b, 6c and one of immobilization permitting connecting lines 13b of the second compartment 6b defining one of the immobilization permitting connecting lines 13b of the third housing 6c, hence their separation.

The connecting lines 13 playing a dual role of separation or immobilization of objects 4 are designed in this example, in particular, to define median lines for objects 4, once these are in place. These are the connecting lines forming a separation between, on one hand, first compartment 6a and second compartment 6b, and, on the other hand, second compartment 6b and third compartment 6c.

In the case of second compartment 6b, connecting line 13 b serving solely for immobilization purposes is extended, if necessary, in the direction of the first edge 9a to define a bottom 16 for first compartment 6a.

The connecting line 13c for completing guiding is provided, in particular, in the area of the first and second compartments 6a, 6b.

According to the form of embodiment illustrated, it will be noted that no opening is provided in the area of the corners of pocket 1, which contributes to enhancing its strength.

Other forms of embodiment, within the grasp of a man of the art, could, of course, have been contemplated without thereby departing from the scope of the invention.

What is claimed is:

1. A device for protecting data storage media comprising:
   digital storage media each being disc-shaped and having a diameter;
   a flexible pocket having at least two opposite faces locally integral with each other, said opposite faces removably receiving said digital storage media therebetween, said pocket having a substantially non-square rectangular shape, said pocket having a length dimension of less than three times said diameter and a width dimension of less than twice said diameter; and dividing means for dividing said pocket into three separate compartments so as to allow for receipt of said digital storage media in staggered locations within said pocket, each of said three separate compartments having an opening formed by a part of an edge of said pocket, said opposite faces not being integral at said opening, each of said three separate compartments having a longitudinal axis, said longitudinal axis being at an acute angle with respect to the edge, said three separate compartments being oriented such that said digital storage media resides by force of gravity at a bottom of the respective compartments.

2. The device of claim 1, said dividing means for holding said digital storage media at two opposite points on a circumference thereof and for guiding said digital storage media toward the bottom of the respective compartments.

3. The device of claim 1, said dividing means being areas of connection between said opposite faces of said pocket.

4. The device of claim 3, said areas of connection being connection lines, adjacent compartments of said three separate compartments being separated by a single connection line.

5. The device of claim 4, each of said three separate compartments having at least two connection lines substantially parallel to each other and spaced apart by a distance approximately equal to said diameter so as to immobilize a respective digital storage media therebetween, at least one of said two connection lines being a part of said single connection line.

6. The device of claim 5 wherein respective ends of said two connection lines defines said opening.

7. The device of claim 6, said three separate compartments comprising:

a first compartment receiving one of said digital storage media at the bottom thereof tangentially to a bottom edge of said pocket, said first compartment having the opening formed on a first side edge of said compartment, said first side edge being perpendicular to said bottom edge;

a second compartment having the longitudinal axis thereof perpendicular to the longitudinal axis of said first compartment, the opening of said second compartment formed along a second side edge of said pocket, said second side edge being parallel to said first side edge; and a third compartment having the longitudinal axis thereof parallel to the longitudinal axis of said second compartment, the opening of said third compartment being formed along a top edge of said pocket, one connection line of said first compartment defining the bottom of said second and third compartments, one of the two connection lines of said second compartment defining one of the two connection lines of said third compartment.

* * * * *